A. W. OVERBAUGH.
Assignor to G. R. WIGHT.
Reservoir Slate-Cleaner.
No. 8,241. Reissued May 21, 1878.
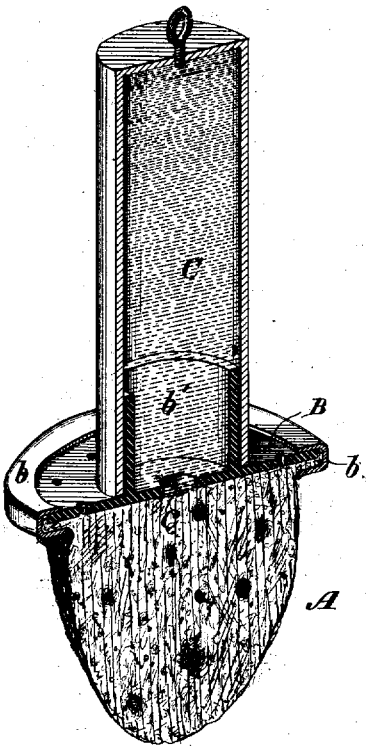
WITNESSES
S. P. Hollingsworth
Wm A Skinkle
INVENTOR
Abraham W Overbaugh
By his Attorneys
Baldwin Hopkins & Peyton
N. PETERS, PHOTO-LITHOGRAPHER, WASHINGTON, D. C.

UNITED STATES PATENT OFFICE.

ABRAHAM W. OVERBAUGH, OF NEW YORK, N. Y., ASSIGNOR TO GEORGE R. WIGHT, OF SAME PLACE.

IMPROVEMENT IN RESERVOIR SLATE-CLEANERS.

Specification forming part of Letters Patent No. 60,045, dated November 27, 1866; Reissue No. 8,241, dated May 21, 1878; application filed April 9, 1878.

*To all whom it may concern:*

Be it known that I, ABRAHAM W. OVERBAUGH, of the city, county, and State of New York, have invented certain new and useful Improvements in Liquid Holding and Supplying Devices, of which the following is a specification:

My invention relates to that class of liquid-supplying devices having a reservoir of convenient size for handling, the mouth of which is closed by a sponge, through which the liquid passes to the surface to which it is to be applied, whereby the liquid is applied in regulated quantities, and without the use of a brush or any detached instrument.

Sponge, owing to its peculiar qualities and characteristics, has been found to possess great advantages in this class of devices.

The object of my invention is the production of a cheap and simple apparatus of the above description possessing advantages over those heretofore suggested, both as to effectiveness and convenience in use.

The subject-matter claimed is hereinafter specifically designated.

The accompanying drawing represents a perspective longitudinal central section through the apparatus.

The liquid-reservoir C is of convenient size and shape for handling, one of its ends being closed, and has stiff or unyielding walls. The mouth or open end of the reservoir is provided with a cap or plate having an extended rim or flange, and also a tubular flange, *b'*, by which latter the cap or plate is secured to the reservoir.

A central opening or perforation, *c*, is made in the cap or plate, through which opening a sponge, A, secured to the cap, is supplied with liquid from the reservoir or receptacle C; and, by means of this sponge, the liquid is applied in any desired or regulated quantities, more or less being applied according to the pressure put upon the sponge in the act of using the instrument. This opening affords a direct and unobstructed channel or passage for the liquid to the sponge, and also permits the surplus liquid to escape back into the reservoir.

The sponge is secured to the cap or plate by means of its rim or extended flange and a clamping-ring, *b*, between which the edges of the sponge are clamped. This affords ready, secure, and convenient means of connecting the sponge and cap.

The cap or plate is readily inserted in or removed from the mouth of the reservoir for the purpose of quickly and conveniently filling the reservoir when emptied and for gaining access thereto.

From the foregoing description of my improvements their advantages will be obvious.

I am aware that the combination of a sponge with a liquid-supplying device is old, being shown in English Letters Patent No. 1,220, of 1854, and do not broadly claim such a device; but in that case the cap or plate carrying the sponge is firmly secured to a rubber ball or vessel having elastic walls.

I am also aware of English Patent No. 520 of 1852; but neither this patent nor No. 1,220, before mentioned, shows a device for applying liquids in regulated quantities possessing the advantages and effectiveness of my improvements, which experience has demonstrated to be of value.

What I claim as my invention is—

1. The combination, substantially as hereinbefore set forth, of a reservoir having stiff walls, constituting a handle by which the device is used, a removable cap fitting the open end or mouth of the reservoir, having an opening or perforation therein for the passage of the liquid, and a sponge secured to and projecting from the cap or cover, closing the opening therein, which sponge is in direct communication or contact with the liquid in the reservoir when the device is being used, whereby a free flow of the liquid to the applying sponge is obtained, greater or less amount of liquid may be applied by pressure on the sponge, and the reservoir readily refilled when emptied.

2. The combination, substantially as hereinbefore set forth, of the perforated cap, the sponge, and the clamping-ring uniting them.

ABRAHAM W. OVERBAUGH.

Witnesses:

EDWARD SCHELL,

R. S. HAYWARD.